United States Patent [19]
Pauwells

[11] 3,747,705
[45] July 24, 1973

[54] COMPACT ADAPTIVE BRAKING SYSTEM
[75] Inventor: Edward M. Pauwells, South Bend, Ind.
[73] Assignee: The Bendix Corporation, South Bend, Ind.
[22] Filed: Feb. 3, 1972
[21] Appl. No.: 223,276

[52] U.S. Cl. .................... 188/181 A, 303/21 CG
[51] Int. Cl. ............................................ B60t 8/12
[58] Field of Search ................. 188/181 A, 181 T, 188/10; 303/21 CF, 21 CG, 21 CH

[56] References Cited
UNITED STATES PATENTS

| | | | |
|---|---|---|---|
| 2,781,871 | 2/1957 | Alterkruse | 188/181 T X |
| 2,868,338 | 1/1959 | Lucien et al. | 188/181 A |
| 3,172,505 | 3/1965 | Stelzer | 188/181 A |

Primary Examiner—Duane A. Reger
Attorney—Ken C. Decker et al.

[57] ABSTRACT

A vehicle anti-skid system is disclosed which senses an incipient skidding condition of any of the vehicle wheels and releases the corresponding brake in response thereto, to prevent the brake from locking. The anti-skid system includes a fluid motor assembly provided for each of the vehicle brakes in addition to the conventional fluid motor assembly which effects a brake application. A linkage interconnects the two fluid motors so that when the fluid motor comprising a part of the anti-skid system is actuated, the force generated by the fluid motor which actuates the brake is overcome, permitting the brake to be released. Electrically operated valve means are responsive to an output signal from an electronic control unit which senses the incipient skid condition to communicate pressurized fluid to the fluid motor which forms a part of the adaptive braking system.

5 Claims, 3 Drawing Figures

COMPACT ADAPTIVE BRAKING SYSTEM

BACKGROUND OF THE INVENTION

This invention relates to an adaptive braking system for a wheeled vehicle.

Although anti-skid systems for automobiles are presently available, they have several disadvantages. For example, they are too large, too complex, too expensive, and they are installed within the normal braking system of the vehicle, thus jeopardizing the safety of an otherwise simple and proven hydraulic system. For these and other reasons, existing adaptive braking systems have been available only on a very limited production basis. Existing vacuum-powered systems are cumbersome due to the large-size diaphragms made necessary by the decreasing supply of engine vacuum available in the modern automobile, and a large hose line that conveys the vacuum to the pressure modulators. On the other hand, hydraulically powered modulators, in spite of their slightly smaller size, are even more expensive and almost as difficult to package within the vehicle. Existing vacuum and hydraulic-powered modulators both require that the brake hydraulic line be extended and routed around the engine compartment and even inside the fenders, making the braking system vulnerable to damage.

SUMMARY OF THE INVENTION

Therefore, an important object of my invention is to provide a relatively small, simple, and inexpensive adaptive braking system for an automotive vehicle.

Another important object of my invention is to provide an adaptive braking system which does not require changes in the normal vehicle hydraulic braking system, thus insuring its reliability.

Another important object of my invention is to provide an adaptive braking system which employs an entirely independent hydraulic system which offsets the applying force exerted in the brake mechanism by use of relatively small hydraulic cylinders and mechanical linkages.

DESCRIPTION OF THE DRAWNGS

DETAILED DESCRIPTION

Figure 1:
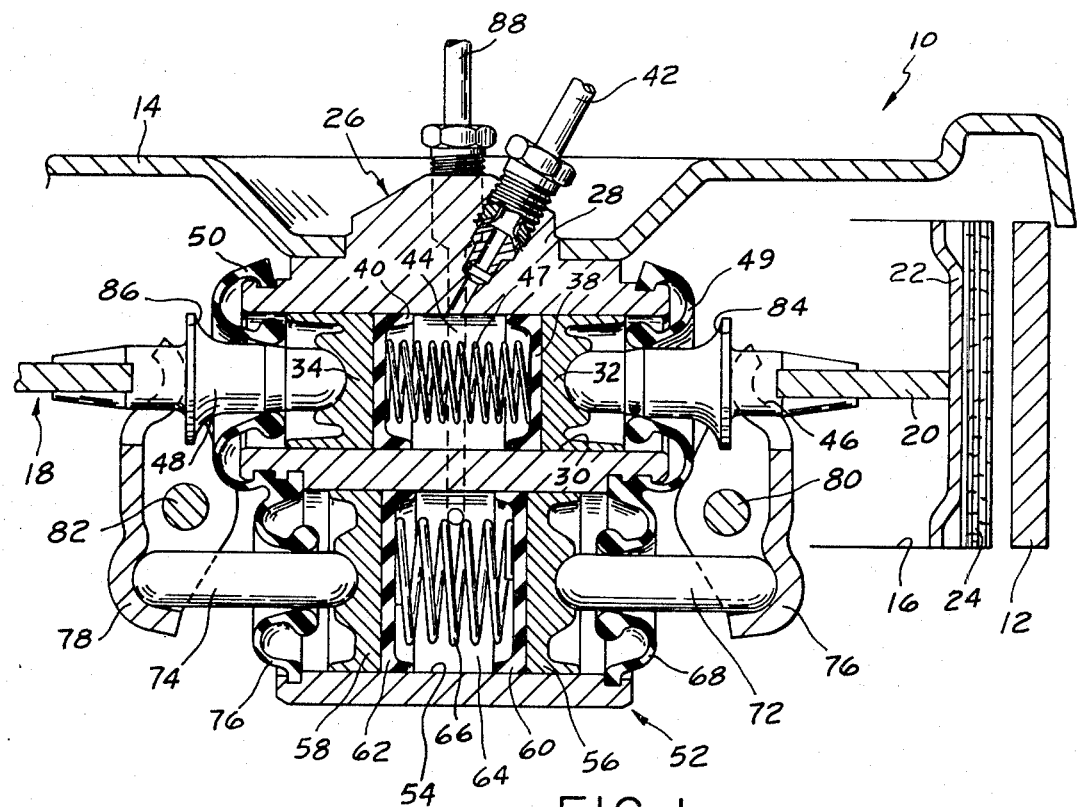
FIG. 1 is a cross-sectional view of a conventional vehicle drum brake provided with an anti-skid device made pursuant to the teaching of my present invention.

Referring now to FIG. 1 of the drawings, a conventional automotive drum brake generally indicated by the numeral 10 includes a drum 12 mounted for rotation with the vehicle wheel and a fixed backing plate 14 which is secured to a non-rotating portion of the vehicle. A pair of brake shoes 16, 18 are slidably mounted on the backing plate 14 in end-to-end relationship and are adapted to be urged into braking engagement with the brake drum 12 when a brake application is effected. The brake shoes 16 and 18 are of conventional design and each include a web portion 20 and a transversely extending portion 22 which carries the friction lining 24. A fluid motor or wheel cylinder generally indicated by the numeral 26 is carried by the backing plate 14 between contiguous ends of the brake shoes 16 and 18. The wheel cylinder 26 includes a housing 28 defining a bore 30 therewithin having a pair of open ends facing toward the brake shoes 16 and 18. A pair of pistons 32, 34 are slidably mounted within the bore 30 and are provided with suitable sealing cups 38, 40 to prevent egress of fluid between the interface between the piston and the wall of the bore. An inlet port 42 communicates the chamber 44 defined between adjacent ends of the pistons 32, 34 and the wall of the bore 30 with the vehicle's master cylinder (not shown). A spring 47 yieldably maintains the cups 38, 40 in engagement with the pistons 32, 34. Connecting links 46, 48 connect a corresponding piston 32 and 34 with the corresponding brake shoes 16 and 18, respectively. Appropriate boots 49, 50 prevent contaminants from interfering with the operation of the pistons 32, 34.

Figure 3:
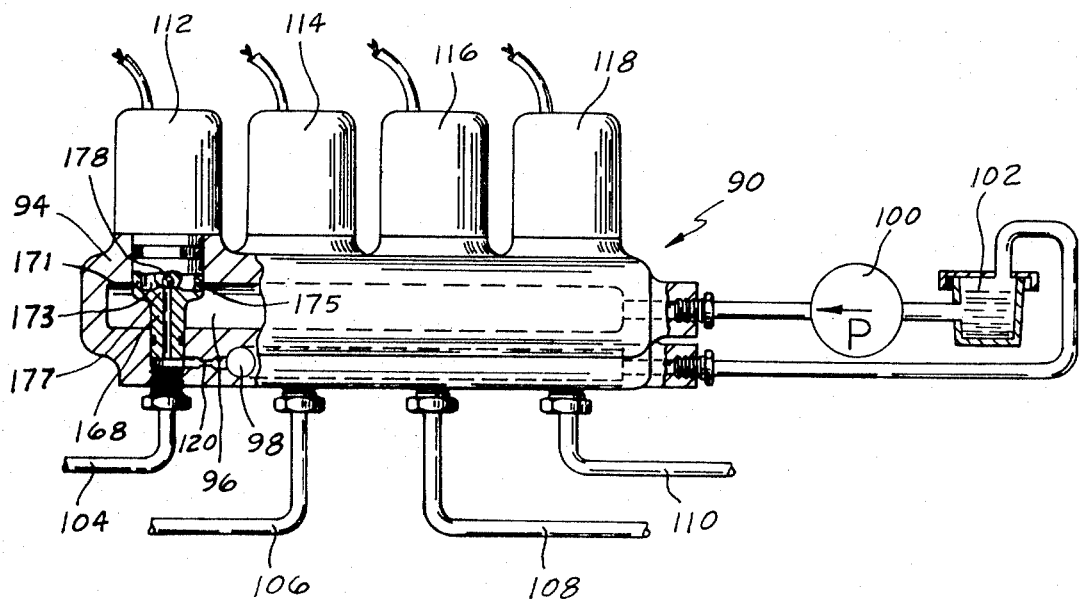
FIG. 3 is a side elevation, partly in section, which illustrates the control valve used to actuate the anti-skid device illustrated in FIGS. 1 and 2.

The anti-skid device according to my invention includes a second fluid motor generally indicated by the numeral 52 which is carried adjacent to, and preferably forms a part of, the fluid motor or wheel cylinder 26. The second fluid motor 52 includes a second bore 54 defined within the housing 28 in which a pair of pistons 56, 58 reciprocate. A pair of sealing cups 60, 62 prevent egress of fluid from the fluid chamber 64 defined between the pistons 56 and 58. A spring 66 within the chamber 64 maintains the cups 60, 62 in engagement with the pistons 56, 58. A pair of boots 68, 70 prevent contaminants from interfering with the proper action of the piston 56, 58. Connecting links 72, 74 connect a corresponding one of the piston 56 and 58, respectively, with corresponding linkages or lever means 76, 78. Each of the linkages 76, 78 is pivotally mounted on a corresponding pivot 80 or 82 which forms a part of the housing 28. One end of the linkages 76, 78 engages the appropriate connecting link 72 or 74, and the other end of each of the linkages 76, 78 engages one of the shoulders 84, 86 provided on the connecting links 46 and 48, respectively. A second fluid inlet port 88 communicates the chamber 64 with a control device generally indicated by the numeral 90 in FIG. 3.

The control device 90 includes a housing 94 defining a first chamber 96 and a second chamber 98 therewithin. The chamber 96 is connected to the outlet of an appropriate fluid pressure source such as the pump 100, the inlet of which is connected to a fluid reservoir generally indicated by the numeral 102. The chamber 98 is also connected to the reservoir 102. Appropriate restricting orifices and relief valves are provided between the chambers 96 and 98 so that the pump 100 charges the chamber 96 to a predetermined pressure when the vehicle's hydraulic system operates normally. Conduits 104, 106, 108 and 110 communicate the chamber 96 with each of the anti-skid actuators at each of the vehicle's brakes. For example, the conduit 104 communicates the chamber 96 with the inlet port 88 of the brake 10 in FIG. 1. Electrically operated valve means 112, 114, 116 and 118 are provided to control fluid communication between the chamber 96 and each of the conduits 104, 106, 108 and 110, respectively. The electrically operated valve means 112, 114, 116 and 118 are responsive to signals from electronic control units (not shown) which process electrical signals received from speed sensors at each of the vehicle's wheels and, when wheel acceleration/deceleration reaches a critical level, actuate the appropriate valve 112, 114, 116 or 118 to relieve pressure in the corresponding brake as will be hereinafter described. The electronic control unit is preferably made pursuant to the teaching in U.S. Pat. No. 3,494,671, owned by the assignee of the present invention and incorporated herein by reference. A flow restricting orifice 120 is provided which communicates the conduit 104 with the chamber 98 to permit flow of fluid at a limited rate from the conduit 104 to the reservoir 102. Similar flow restricting orifices are provided between each of the conduits 106, 108 and 110 and the chamber 98.

Since each of the valve mechanisms 112, 114, 116 and 118 are identical, only valve structure 112 will be described in detail. Conduit 104 extends through an annular adapter 168 which is mounted in chamber 96 and which terminates in a flared portion 171 defining compartment 173 therewithin. A passage 175 communicates compartment 173 with chamber 96, and conduit 104 communicates with compartment 173 through valve seating area 177. A spherical valve element 178 is secured to the armature of the solenoid and is movable therewithin into and out of engagement with the valve seat 175 to control communication from compartment 173 into the conduit 104.

Figure 2:
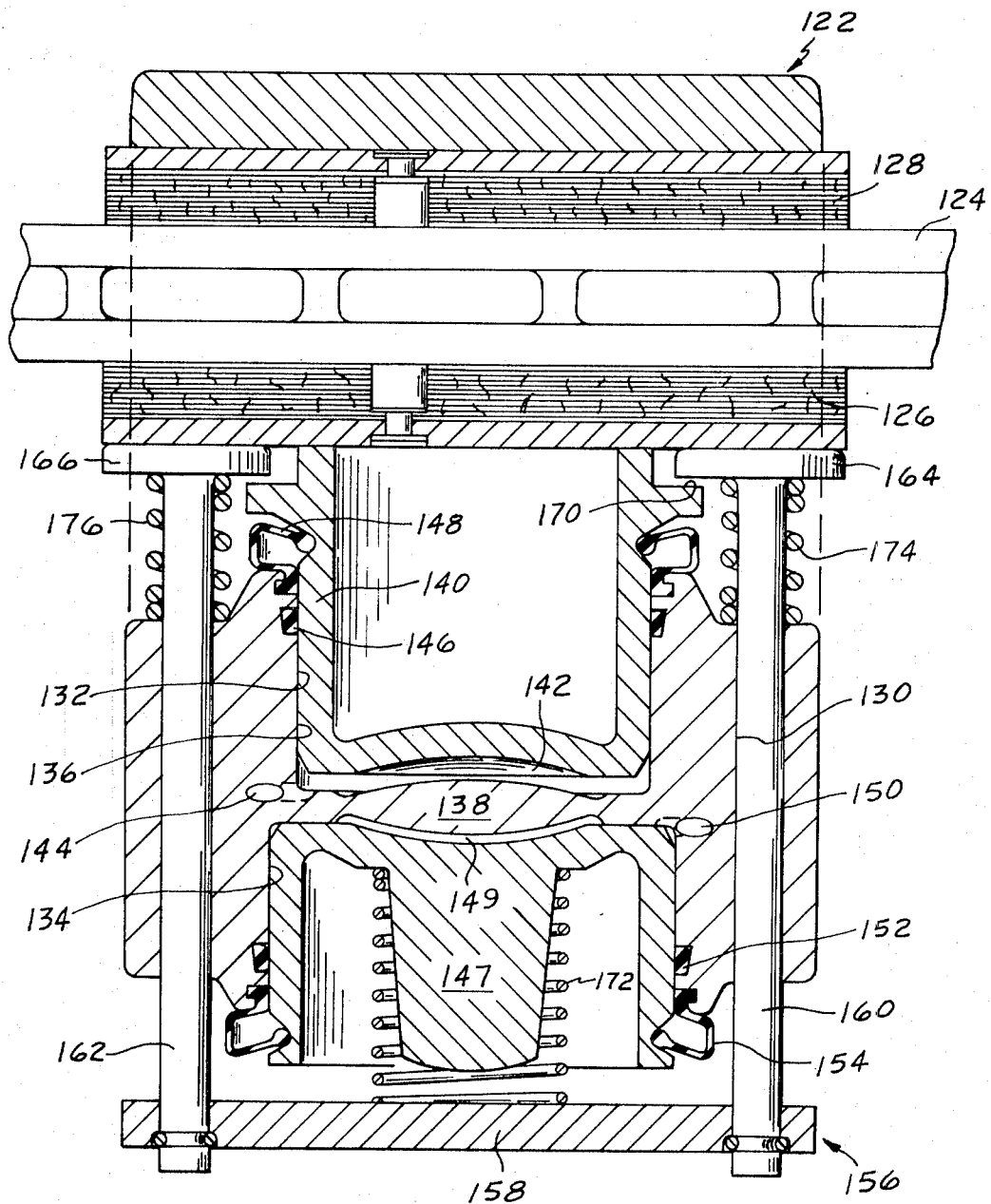
FIG. 2 is a cross-sectional view of a conventional automotive disc brake equipped with an anti-skid device made pursuant to the teachings of my present invention.

Referring now to FIG. 2 of the drawings, a disc brake embodying the anti-skid actuator made pursuant to the teachings of my invention is illustrated. The brake mechanism is generally indicated by numeral 122 and includes a rotor 124 which is mounted for rotation with the corresponding vehicle wheel. A pair of friction elements 126 and 128 are mounted adjacent opposite sides of the rotor 124 and are adapted to be urged thereagainst when a brake actuation is effected to retard rotation of the rotor. A caliper generally indicated by the numeral 130 is slidably mounted on a fixed torque member (not shown) and extends across the periphery of the rotor 124 to support the friction element 128. The caliper 130 defines a bore 132 therewithin which is divided into larger and smaller diameter sections 134 and 136 by a partition 138. A piston 140 is slidably mounted in section 136 of the bore 132 and cooperates with the partition 138 to define a chamber 142 therebetween which is communicated to the vehicle's master cylinder by an inlet port 144. An appropriate seal 146 and a boot 148 are provided to prevent fluid from leaking from the chamber 142 and to exclude contaminants from the bore 132. As is well known to those skilled in the art, admission of high pressure fluid into the chamber 142 from the vehicle's master cylinder urges the piston 140 and, therefore, the friction element 126, toward the rotor 124. Since the caliper 130 is slidably mounted on the fixed torque member, actuation of the piston 140 provides reaction forces acting through the portion of the rotor extending across the periphery of the rotor 124 so that the friction element 128 is also urged against the rotor 124.

The anti-skid mechanism according to the present invention includes a second piston 147 slidably mounted in portion 134 of bore 132 and which cooperates with the partition 138 to define a fluid chamber 149 therebetween which is communicated with one of the conduits 104, 106, 108 and 110 by an inlet port 150. An appropriate seal 152 and a boot 154 prevent fluid leakage from the chamber 149 and also exclude contaminants from the bore section 134. Linkage means generally indicated by the numeral 156 include a cross beam 158 and a pair of pins 160, 162 connected to the cross beam 158 and which extend through the caliper 130 in a direction generally parallel to the axis of the bore 132. Each of the pins 160, 162 terminates in a head 164, 166 which are adapted to engage a shoulder 170 provided on the piston 140 as will hereinafter be discussed. Springs 172, 174 and 176 yieldably urge the piston 147 and the linkage means 156 toward the position illustrated in the drawings.

MODE OF OPERATION

When a brake application is effected in a system employing the drum brake 10, high pressure fluid from the vehicle's master cylinder (not shown) is admitted into the chamber 44 through inlet port 42. The high pressure fluid in the chamber 44 exerts a force on the pistons 32, 34, urging them outwardly relative to the bore 30, and thereby urging the brake shoes 16, 18 into engagement with the drum 12. Frictional engagement of the brake shoes with the drum retards rotation of the corresponding vehicle wheel. When the aforementioned electronic control unit (not shown) senses an incipient skidding condition of the wheel on which brake drum 12 is mounted, the electronic control unit signals the electrically operated control valve 112 to open. When the control valve 112 opens, high pressure fluid from the chamber 96 is admitted into the conduit 104 and therefore into the chamber 64 through port 88. High pressure fluid in the chamber 64 acting on the pistons 56, 58 urges them apart, and this movement is transmitted through the linkages 76, 78 to the links 46 and 48. Since the diameters of the pistons 56 and 58 are much larger than that of the pistons 32 and 34, a higher force will be generated by the pistons 56 and 58 if the fluid pressure level in the chamber 64 is at least equal to the fluid pressure level in the chamber 44. Therefore, outward movement of the pistons 56 and 58 will urge the corresponding pistons 32 and 34 back toward the center of the bore, thereby permitting the brake shoes 16 and 18 to move away from the drum 12, permitting the corresponding wheel on which the drum 12 is mounted to re-accelerate. When the wheel accelerates to a predetermined reference level, the electronic control unit then signals the valve 112 to close, thereby terminating the fluid communication between the high pressure fluid in the chamber 96 into the conduit 104. High pressure fluid trapped in the chamber 64 then bleeds through the orifice 120 into the low pressure chamber 98 and then back to the reservoir 102, thereby permitting the conventional return springs (not shown) provided on the brake 10 to return the pistons 56 and 58 to the positions illustrated in FIG. 1. Thereafter, high pressure fluid in the chamber 44 is again permitted to urge the brake shoes against the drum until another anti-skid cycle is initiated. Of course, similar mechanisms provided at the other brake of the vehicle are communicated into the conduit 106, 108 and 110, respectively. Therefore, individual four-wheel control is provided by independent actuation of the valve 112, 114, 116 and 118.

One or more wheels of the vehicle may be equipped with a disc brake as illustrated in FIG. 2. When a brake application is effected, high pressure fluid from the vehicle's master cylinder is admitted into the chamber 142 through inlet port 144, thereby urging the friction elements 126 and 128 into engagement with rotor 124 as described hereinabove. As the rotor 124 and the associated wheel upon which the rotor is mounted decelerates past the critical value, the aforementioned electronic control unit opens electrically operated valve 112 to admit high pressure fluid from the chamber 96 into the conduit 104. Since the conduit 104 is connected to the inlet port 150, high pressure fluid will be communicated into the chamber 149 where it acts upon the rear face of the piston 147 urging the latter outwardly from the bore 134 into engagement with the cross member 158. Further movement of the piston 147 urges the cross member 158 downwardly viewing FIG. 2, and this movement engages the heads 166, 168 with the shoulder 170 provided on the piston 140. Since the diameter of the piston 147 is substantially larger than the diameter of the piston 140, equal or lower fluid pressure levels in the chamber 149 as compared to the pressure level in the chamber 142 will develop a force urging the piston 140 toward the partition 138, therefore permitting the friction elements 126, 128 to move away from the rotor 124. When this occurs, the wheel on which the rotor 124 is mounted reaccelerates, and when this acceleration reaches the predetermined reference level, the electronic control unit again signals the valve 112 to close, thereby terminating fluid communication between the high pressure chamber 96 and the conduit 104. High pressure fluid which is then trapped in the chamber 149 bleeds through the orifice 120 into the low pressure chamber 98 and then back into the reservoir 102. Therefore, the springs 172, 174 and 176 are permitted to return to linkage means 156 and the piston 147 to the position illustrated in the drawing, thereafter again permitting high pressure fluid in the chamber 142 to again effect a brake application. Therefore, when the wheel upon which the rotor 124 again decelerates to the predetermined critical level, the electronic control unit initiates another anti-skid cycle. This operation of the anti-skid system continues until the vehicle is brought to a halt or safe stop and the master cylinder is released.

I claim:

1. In an adaptive braking system for a wheeled vehicle having a brake for each wheel;
   each of said brakes including a member mounted for rotation with a corresponding wheel, friction means mounted adjacent said member, first fluid pressure responsive means for urging said friction means into frictional engagement with said member, second fluid pressure responsive means mounted adjacent said first fluid pressure responsive means, linkage means operably connecting said first and second fluid pressure responsive means to permit said second fluid pressure responsive means to oppose said first fluid pressure responsive means when fluid pressure is communicated to said second fluid pressure responsive means;
   control means responsive to acceleration and deceleration of said corresponding wheel for generating an output signal when said corresponding wheel decelerates at a predetermined critical level; and
   means responsive to said output signal for communicating fluid pressure to said second fluid pressure responsive means;
   said first fluid pressure responsive means including a housing defining a bore therewithin, first piston means slidable in said bore and extending therefrom to engage said friction means, said linkage means engaging said first piston means upon actuation of said second fluid pressure responsive means to prevent further outward movement of said first piston means.

2. In an adaptive braking system for a wheeled vehicle having a brake for each wheel:
   each of said brakes including a member mounted for rotation with a corresponding wheel, friction means mounted adjacent said member, first fluid pressure responsive means for urging said friction means into frictional engagement with said member, second fluid pressure responsive means mounted adjacent said first fluid pressure responsive means, linkage means operably connecting said first and second fluid pressure responsive means to permit said second fluid pressure responsive means to oppose said first fluid pressure responsive means when fluid pressure is communicated to said second fluid pressure responsive means;
   control means responsive to acceleration and deceleration of said corresponding wheel for generating an output signal when said corresponding wheel decelerates at a predetermined critical level; and
   means responsive to said output signal for communicating fluid pressure to said second fluid pressure responsive means;
   said second fluid pressure responsive means including a housing defining a bore therewithin, piston means slidable in said bore and extending therefrom to engage said linkage means, said means responsive to said output signal communicating fluid to said bore when said output signal is generated to urge said piston means to actuate said linkage means to a position preventing further actuation of said first fluid pressure responsive means.

3. The invention of claim 2:
   said first fluid pressure responsive means including a housing defining a bore therewithin, first piston means slidable in said bore and extending therefrom to engage said friction means, said linkage means engaging said first piston means upon actuation of said second fluid pressure responsive means to oppose the force generated by said first piston means.

4. In an adaptive braking system for a wheeled vehicle having a brake for each wheel:
   each of said brakes including a member mounted for rotation with a corresponding wheel, friction means mounted adjacent said member, first fluid pressure responsive means for urging said friction means into frictional engagement with said member, second fluid pressure responsive means mounted adjacent said first fluid pressure responsive means, linkage means operably connecting said first and second fluid pressure responsive means to permit said second fluid pressure responsive means to oppose said first fluid pressure responsive means when fluid pressure is communicated to said second fluid pressure responsive means;
   control means responsive to acceleration and deceleration of said corresponding wheel for generating an output signal when said corresponding wheel decelerates at a predetermined critical level; and means responsive to said output signal for communicating fluid pressure to said second fluid pressure responsive means;

said member being a brake drum, said friction means being a pair of arcuate brake shoes arranged in end-to-end relationship and carried on said vehicle adjacent said drum, said first fluid pressure responsive means including a housing defining a bore therein mounted between contiguous ends of said shoes, a first pair of pistons slidably mounted in said bore and connected to the end of a corresponding brake shoe, and means communicating pressurized fluid into said bore between said pistons to force the latter apart when a brake application is effected to urge said shoes against said drum, said second pressure responsive means including a bore, a second pair of pistons slidably mounted therein and operably connected to said linkage means and adapted to urge said first pair of pistons toward one another when fluid pressure is communicated into the chamber defined between said second pair of pistons, said means responsive to said output signal communicating fluid pressure into said chamber between said second pair of pistons when said output signal is generated.

5. In an adaptive braking system for a wheel vehicle having a brake for each wheel:

each of said brakes including a member mounted for rotation with a corresponding wheel, friction means mounted adjacent said member, first fluid pressure responsive means for urging said friction means into frictional engagement with said member, second fluid pressure responsive means mounted adjacent said first fluid pressure responsive means, linkage means mounted connecting said first and second fluid pressure responsive means to permit said second fluid pressure responsive means to oppose said first fluid pressure responsive means when fluid pressure is communicated to said second fluid pressure responsive means;

control means responsive to acceleration and deceleration of said corresponding wheel for generating an output signal when said corresponding wheel decelerates at a predetermined critical level; and means responsive to said output signal for communicating fluid pressure to said second fluid pressure responsive means;

said member being a rotor having a pair of substantially parallel sides, said friction means being a pair of friction elements, each of said elements being disposed adjacent one of said parallel sides, said brake further including a caliper defining a bore therein slidably mounting an actuating piston, said caliper being slidably mounted on said vehicle and extending across said rotor to engage each of said friction elements, a partition dividing said bore into first and second sections, said actuating piston being slidable in said first section and cooperating with said partition to define a first fluid receiving chamber therebetween, said piston being urged toward said rotor when fluid pressure is communicated into said first chamber, said second fluid pressure responsive means including a second piston slidably mounted in said second section and cooperating with said partition to define a second fluid chamber therebetween communicated to said means responsive to said output signal to communicate fluid pressure into said second chamber when said output signal is generated, said linkage means interconnecting said pistons whereby said second piston urges said first piston away from said rotor to release said brake when fluid pressure is communicated into said second chamber.

* * * * *